Sept. 23 1924

C. WERRA

NONFERROUS MELTING FURNACE

Filed Dec. 10, 1923  2 Sheets-Sheet 1

1,509,277

INVENTOR.
Conrad Werra
BY
Morsell, Keeney & Morsell,
ATTORNEYS

Sept. 23, 1924.                                                                 1,509,277
                              C. WERRA
                      NONFERROUS MELTING FURNACE
                       Filed Dec. 10, 1923          2 Sheets-Sheet 2

INVENTOR.
Conrad Werra.
BY
Morsell, Kenney & Morsell,
ATTORNEYS.

Patented Sept. 23, 1924.

1,509,277

UNITED STATES PATENT OFFICE.

CONRAD WERRA, OF WAUKESHA, WISCONSIN.

NONFERROUS MELTING FURNACE.

Application filed December 10, 1923. Serial No. 679,682.

*To all whom it may concern:*

Be it known that I, CONRAD WERRA, citizen of the United States, and resident of Waukesha, in the county of Waukesha, State of Wisconsin, have invented new and useful Improvements in Nonferrous Melting Furnaces, of which the following is a description, reference being had to the accompanying drawings, which are a part of this specification.

This invention relates to improvements in non-ferrous melting furnace.

It is the present practice in melting aluminum or other non-ferrous metal in foundries to use a semi-spherical cast iron pot provided with a flange which is supported on a fire brick lining contained within a steel sheet. Air and oil is supplied to a burner nozzle to provide a rotating flame within the furnace and around the pot, and a cover over the pot functions as an insulation against the outside air. The material to be melted is placed in the pot through the top opening and the melted metal is removed through the same opening by dipping. In practice this type of furnace consumes approximately 2.4 gals. of 32° Baumé fuel oil per 100 lbs. of aluminum melted to 1450° F.

This form of furnace is not very efficient, and its inefficiency resides principally in the fact that a proportionately large surface of the metal is exposed to the outside temperature and it radiates the heat supplied to the lower portion of the pot at an enormous rate and also causes loss by condensation. On account of this rapid radiation, a correspondingly larger amount of heat must be supplied to the bottom portion of the pot, which results in a temperature far in excess of that required to melt the aluminum. These temperatures, although not known exactly, are estimated to reach no less than 2500° F. at certain portions of the pot. Cast iron pots start scaling at 1800° F. and at these high temperatures the pots do not last very long.

It is one of the objects of the present invention to overcome the before mentioned objectionable features and provide a non-ferrous melting furnace in which the entire melting pot is subjected to the heating medium instead of heating at the bottom and condensing at the top.

A further object of the invention is to provide a non-ferrous melting furnace in which the heat is applied to all portions of the pot, thereby increasing the efficiency and permitting a reduction in the temperature required to a point several hundred degrees below the scaling temperature of iron pots while increasing the rapidity of the melting rate of aluminum over other methods and decreasing the consumption of fuel.

A further object of the invention is to provide a non-ferrous melting furnace also adapted for metals of lower melting points than aluminum, thereby permitting the use of proportionately lower temperatures and thus increasing the life of the melting pots to a large extent.

A further object of the invention is to provide a non-ferrous melting furnace which permits thorough heat insulation against heat losses in the vicinity of the charging door and the discharge opening of the pot.

A further object of the invention is to provide a non-ferrous melting furnace having air-tight charging and discharging openings to prevent the free air from contacting with the molten metal, and thereby reducing loss through oxidation and improving the grade of the metal and the quality of castings made therefrom.

A further object of the invention is to provide a non-ferrous melting furnace in which all of the gases and waste heat are carried off without discomfort or hardship to the furnace tenders.

A further object of the invention is to provide a non-ferrous melting furnace which may be continuously operated and which has the capacity of a number of furnaces of the ordinary type, and which also occupies but a small amount of space compared to the number of ordinary furnaces required to do the same amount of work.

A further object of the invention is to provide a non-ferrous melting furnace having a covered top opening which may be easily opened to permit the free entry of the furnace heat at the beginning of the melting operation to expedite the first heating.

A further object of the invention is to provide a non-ferrous melting furnace in which scrap aluminum, which is usually heavily coated with grease, may be melted, as the top opening permits the discharge of the gases generated from said grease.

A further object of the invention is to provide a non-ferrous melting furnace which is adapted to melt non-ferrous scrap metals in large quantities due to the fact that the furnace of the present invention may be made of any capacity.

A further object of the invention is to provide a non-ferrous melting furnace having a top opening and cover in which the top cover may be removed in a very simple manner, if desired, in melting non-ferrous metals, or it may be used to exclude from the metals, the gases resulting from combustion.

A further object of the invention is to provide a non-ferrous melting furnace of such form as to receive ingots of aluminum and other non-ferrous metals and permit their complete submergence in the molten mass within the furnace pot to expedite the melting of said ingots.

A further object of the invention is to provide a non-ferrous melting furnace which is of simple construction, is strong and durable and is well adapted for the purpose described.

With the above and other objects in veiw, the invention consists of the improved non-ferrous melting furnace and its parts and combinations as set forth in the claims and all equivalents thereof.

In the accompanying drawings in which the same reference characters indicate the same parts in all of the views.

Figure 1:
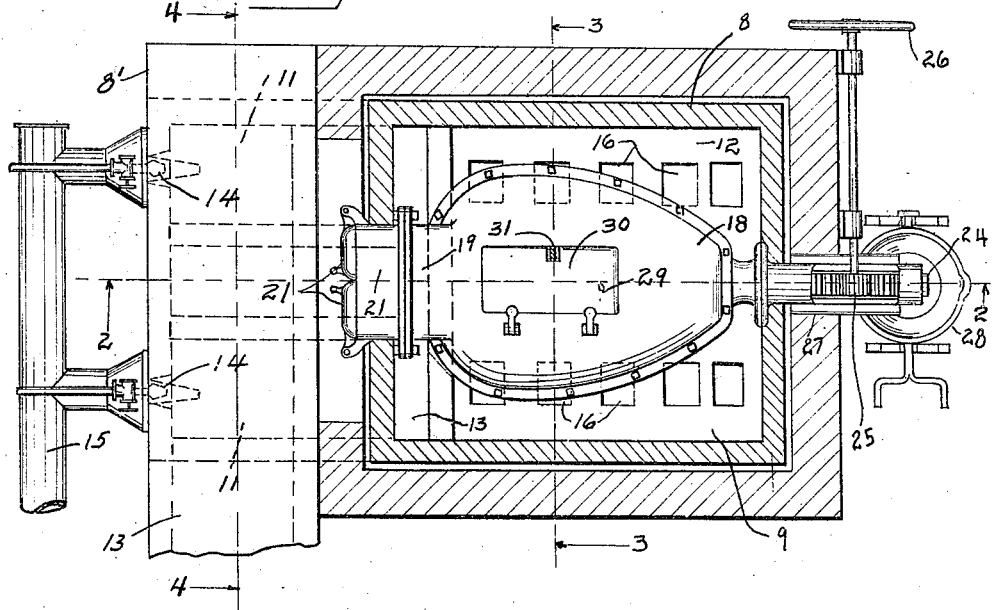
Fig. 1 is a top view partly in section of the improved non-ferrous melting furnace.
Figure 2:
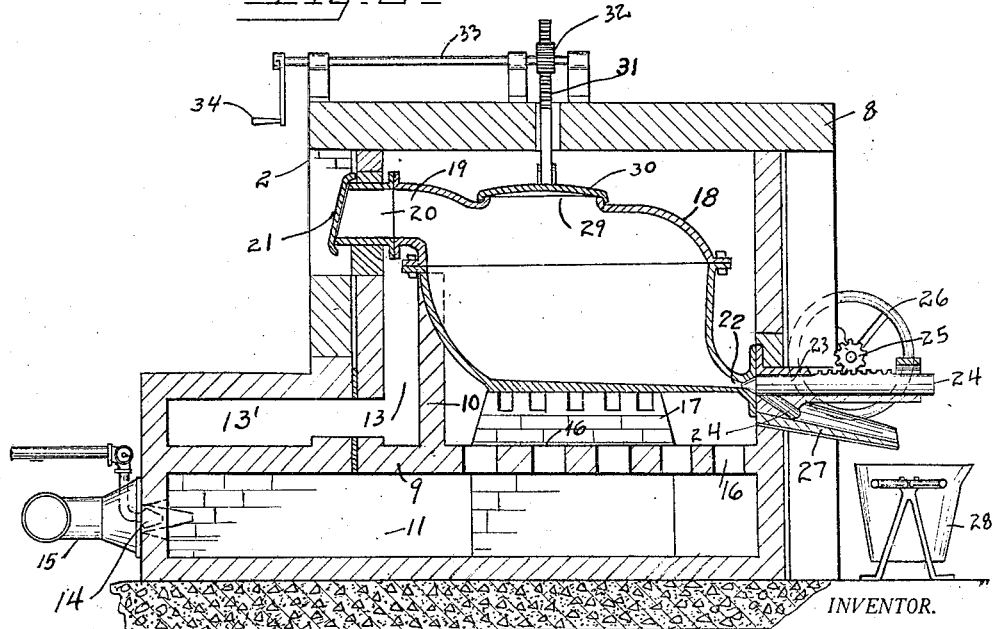
Fig. 2 is a vertical longitudinal sectional view taken on line 2—2 of Fig. 1.
Figure 3:
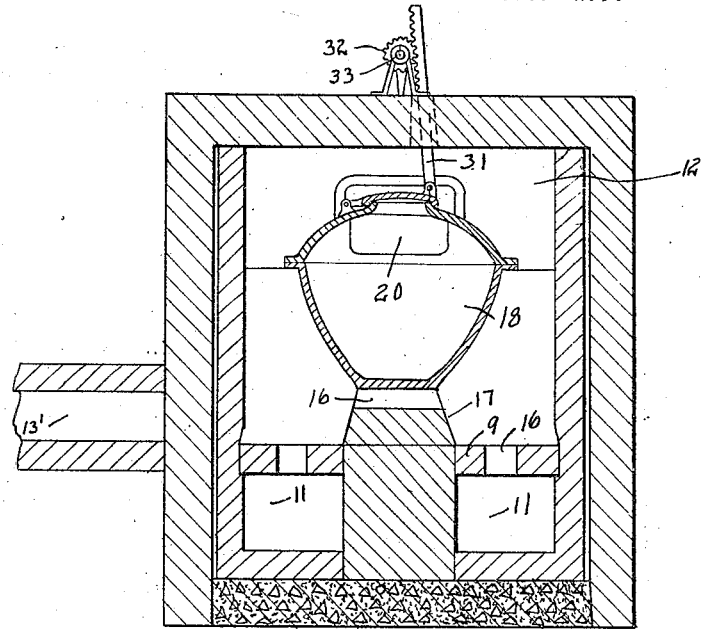
Fig. 3 is a vertical transverse sectional detail view taken on line 3—3 of Fig. 1.
Figure 4:
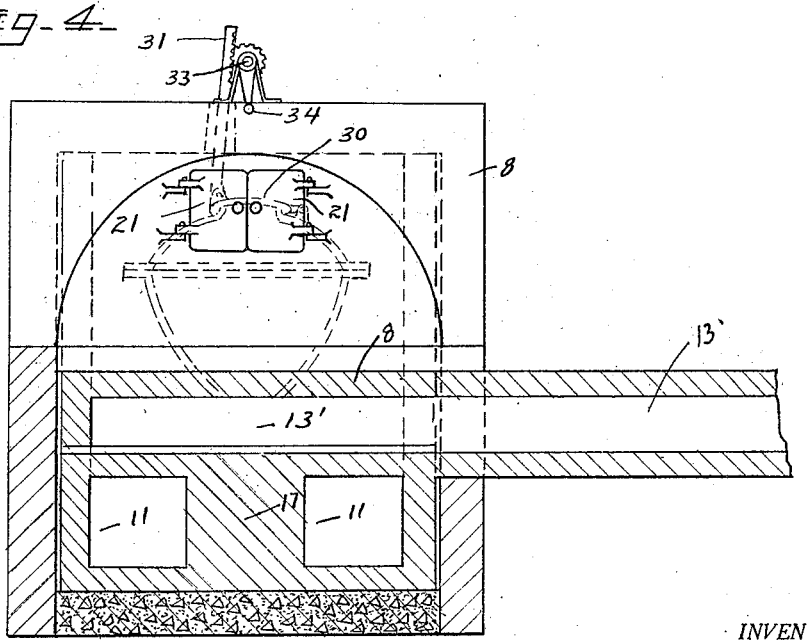
Fig. 4 is a transverse sectional view taken on line 4—4 of Fig. 1.

Referring to the drawings, the numeral 8 indicates an enclosed chamber which may be of the double wall type and is provided with a forward extension 8', a horizontal partition 9 and a vertical baffle wall 10 to form burner compartments 11, a melting pot compartment 12 and a flue 13 through which the products of combustion pass. Said flue extends outwardly and then at right angles through the extension 8' over the burner compartments, as indicated by the numeral 13', to a point of discharge. The burner compartments 11 are separated from each other and at their forward ends are provided with burners 14 which receive fuel from a source of supply, and a pipe 15 supplies air to the burners for combustion. The horizontal partition 9 immediately above the combustion compartments is provided with spaced openings 16 through which the burning gases from the burners 14 flow in passing through the furnace to distribute the heat uniformly within the melting pot compartment 12. A supporting wall or foundation 17 extending upwardly from a medial portion of the enclosing chamber has mounted thereon an iron melting pot 18 which is preferably formed of two parts bolted together. The melting pot is of somewhat oval form lengthwise and is of sufficient length to receive ingots of metal and permit their being submerged in the molten mass contained within the pot. The upper portion of the pot is formed with a feed throat 19 to which an extension 20 is bolted and said extension projects through the front wall of the chamber 8 and is provided with doors 21 to close the opening. A discharge opening 22 is formed in the lower rear portion of the melting pot and an extension 23 connected to the open portion is provided with a toothed plunger valve 24 which is controlled by a gear 25, said gear is turned by a hand wheel 26 and the extension 23 is formed with a downwardly inclined discharge opening 24 which is uncovered when the plunger valve is moved outwardly. A trough 27 positioned immediately beneath the extension inclined discharge opening 24 to receive the molten stream and direct it into the receiving vessel 28 placed adjacent thereto when desired.

The upper portion of the melting pot is formed with an opening 29 closed by a hinged cover 30, and a rack bar 31 connected at its lower end to said cover extends upwardly through an opening in the chamber 8 and is engaged by a gear wheel 32. Said gear wheel is mounted on a shaft 33 which extends forwardly above the chamber and at its front end is provided with a handle 34 so that the operator can conveniently open or close the melting pot top cover. The transverse openings in the melting pot foundation provide for the hot gases to pass therebeneath and thus surround the pot with the hot gases.

In use, metal ingots are placed in the pot through the inlet opening and the burners are lighted to heat the same and in burning the hot gases will pass upwardly through the partition openings 16 and all around the melting pot on their way over the baffle wall to the flue 13. As the inlet and discharge openings to the melting pot are closed, all sides of the pot containing the metal to be melted will be subjected to the heat. When the metal in the pot is in a molten state, the plunger valve is opened and a portion of the metal is discharged for use, and the pot is replenished with additional material which is submerged in the molten mass and is melted in a very short time and after which time the discharging operation may be repeated thus providing practically a continuously operated melting furnace of large capacity. In melting oil covered scrap metal the top cover 30 is opened to permit the oil to freely burn and the gases to pass off and the cover then lowered to complete the melting operation. It may also be desirable in melting some metals to also open the top opening to expedite the heating of the contents of the pot.

It is to be understood that the inlet and outlet openings may be closed in any manner desired without departing from the spirit and scope of the invention.

From the foregoing description it will be seen that the non-ferrous melting furnace is of very simple construction and is well adapted for the purpose described.

What I claim as my invention is:

1. A melting furnace, comprising a chamber, a melting pot positioned entirely within the chamber and having horizontal extension portions provided with charging and discharging openings extending outwardly through said chamber, and means for supplying heat to said chamber and to approximately all sides and the top and bottom portions of the melting pot.

2. A melting furnace, comprising a chamber having a combustion compartment and a melting compartment, a melting pot positioned entirely within the melting compartment and having horizontal extension portions provided with charging and discharging openings extending outwardly through said chamber, means for supplying hot gases to the combustion compartment, and means for directing said gases around approximately all sides and the top and bottom portions of the melting pot.

3. A melting furnace, comprising a chamber having a combustion compartment and a melting compartment, a melting pot positioned entirely within the melting compartment and having extension portions provided with charging and discharging openings extending outwardly through said chamber, said melting pot also having an upper opening closed by a cover also within the melting compartment, means for supplying hot gases to the combustion compartment, and means for directing said gases from the combustion compartment to the melting compartment and around approximately all sides and the top and bottom portions of the melting pot.

4. A melting furnace, comprising a chamber having a horizontal partition to divide the chamber into a combustion compartment and a melting compartment, a melting pot positioned in the melting compartment and having extension portions provided with charging and discharging openings extending outwardly through said chamber, said melting pot also having an upper opening closed by a cover also within the melting compartment, said horizontal partition having openings directly beneath and on opposite sides of the melting pot, and means for supplying hot gases to the combustion compartment which pass upwardly through the partition openings and around approximately all sides and the top and bottom portions of the melting pot.

5. A melting furnace, comprising a chamber having a horizontal partition and a vertical baffle wall to form a combustion compartment and a melting compartment and a discharge flue, a melting pot positioned in the melting compartment and having charging and discharging openings extending outwardly through the chamber, said melting pot also having an upper opening closed by a cover and said horizontal partition having openings on opposite sides of the melting pot, and means for supplying hot gases to the combustion compartment which pass upwardly through the partition openings and approximately around all sides of the melting pot and then downwardly through the flue.

6. A melting furnace, comprising a chamber, an elongated melting pot therein and having charging and discharging openings extending outwardly through the chamber, said melting pot also having an upper opening closed by a cover, means extending outside of the chamber for controlling the movement of said cover to open or closed position, a closure for the charging opening, a closure for the discharge opening, and means for directing heat against approximately all sides of the melting pot, to melt the contents thereof, said application of heat being also permitted during the charging or discharging operation of the melting pot.

7. A melting furnace, comprising a chamber having a melting compartment and a pair of combustion compartments, the melting compartment having a baffle wall spaced from an outer wall to form a discharge flue therebetween, a melting pot within the melting compartment and having a charging opening extending through one wall of the chamber and a discharge opening extending through another wall of said chamber, said melting pot also having a top opening closed by a cover, means outside of the chamber for moving said cover to open or closed position, closures for the charging and discharging openings of the melting pot, and means for directing hot gases from the combustion compartments into the melting compartment and around approximately all sides of the melting pot and then over the baffle wall and through the discharge flue.

8. A melting furnace, comprising a chamber having a pair of combustion compartments and a melting compartment thereabove and in communication with the combustion compartments, the melting compartment having a baffle wall spaced from an outer wall to form a discharge flue therebetween an elongated melting pot within the melting compartment and having a charging opening extending over the discharge flue and through one wall of the chamber and also having a discharging opening which extends through a chamber wall, said melting pot also having a top opening closed by a cover, means outside of said chamber for moving said cover to open or closed position, a door closing the charging opening, a plunger valve closing the discharge opening, and burners for directing hot gases into the combustion compartments and therefrom to the melting compartment and around approximately all sides of the melting pot and then over the baffle wall and through the discharge flue.

In testimony whereof, I affix my signature.

CONRAD WERRA.